US008287078B2

(12) United States Patent
Nguyen et al.

(10) Patent No.: US 8,287,078 B2
(45) Date of Patent: Oct. 16, 2012

(54) INKJET PRINTING SYSTEM HAVING ENVIRONMENTALLY RESPONSIVE THERMAL CONTROL MODE

(75) Inventors: Ngoc-Diep Thi Nguyen, Portland, OR (US); Suresh Anjaneyelu Venkatswamy, Sherwood, OR (US); Raymond Lew, Beaverton, OR (US); Brent R. Jones, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 297 days.

(21) Appl. No.: 12/842,505

(22) Filed: Jul. 23, 2010

(65) Prior Publication Data

US 2012/0019585 A1 Jan. 26, 2012

(51) Int. Cl.

| | |
|---|---|
| ***B41J 29/38*** | (2006.01) |
| ***B41J 2/175*** | (2006.01) |
| ***G01D 11/00*** | (2006.01) |

(52) U.S. Cl. ................................ 347/17; 347/88; 347/99

(58) Field of Classification Search .................... 347/17, 347/88, 99

See application file for complete search history.

(56) References Cited

U.S. PATENT DOCUMENTS

| | | | | |
|---|---|---|---|---|
| 5,680,165 | A * | 10/1997 | Takizawa et al. | 347/88 |
| 5,954,820 | A | 9/1999 | Hetzler | |
| 6,373,237 | B1 | 4/2002 | Oldendorf et al. | |
| 6,885,974 | B2 | 4/2005 | Holle | |
| 7,129,593 | B2 | 10/2006 | King et al. | |
| 7,296,171 | B2 | 11/2007 | Hahn et al. | |
| 7,324,771 | B2 | 1/2008 | Lemaster et al. | |
| 7,382,474 | B2 | 6/2008 | Motosugi et al. | |
| 7,424,632 | B2 | 9/2008 | Powers et al. | |
| 2001/0047490 | A1 | 11/2001 | Barbee | |
| 2007/0103523 | A1 | 5/2007 | Snyder et al. | |
| 2007/0229567 | A1 * | 10/2007 | Hayashi et al. | 347/17 |
| 2008/0109663 | A1 | 5/2008 | Snyder et al. | |
| 2010/0104309 | A1 | 4/2010 | Ferlitsch | |

* cited by examiner

*Primary Examiner* — Jason Uhlenhake

(74) *Attorney, Agent, or Firm* — Maginot, Moore & Beck, LLP

(57) ABSTRACT

A method has been developed that reduces the electrical energy consumption of an inkjet printing system. The method regulates the energy consumption of the printing system with reference to a monitored temperature of at least one component in the inkjet printing system.

26 Claims, 8 Drawing Sheets

INKJET PRINTING SYSTEM HAVING ENVIRONMENTALLY RESPONSIVE THERMAL CONTROL MODE

TECHNICAL FIELD

The present disclosure relates generally to inkjet printing systems and, more particularly, to inkjet printing systems having temperature regulated components.

BACKGROUND

Inkjet printers eject ink drops from printhead nozzles in response to pressure pulses generated within the printhead by either piezoelectric inkjet ejectors or thermal transducer inkjet ejectors. The pressure pulses propel the ejected ink drops onto a recording medium to form an ink image. In a typical piezoelectric inkjet printer, a controller applies electric pulses, referred to as firing signals, to the piezoelectric inkjet ejectors to produce the pressure pulses, which eject liquid ink drops from the nozzles. The controller may electronically address each inkjet ejector individually to enable a firing signal to be generated and delivered for each inkjet ejector. The firing signal causes a piezoelectric device of the inkjet ejector receiving the firing signal to bend or deform a diaphragm and pressurize a volume of liquid ink in a chamber adjacent the diaphragm. Ink from a reservoir in the printhead refills the inkjet channels as the diaphragm returns to its rest position and produces a negative pressure that pulls ink into the inkjet ejector.

An inkjet printer may print images with numerous types of ink including phase change ink, gel ink, aqueous ink, and the like. Phase change ink, also referred to as solid ink, remains in the solid phase at an ambient temperature, which is the temperature of the air surrounding the printer. Accordingly, before the printhead may eject phase change ink onto the image receiving member, the printer heats the printhead and the solid ink therein to produce liquid ink suitable for ejection. Gel ink remains in a gelatinous state at ambient temperature. Before the printhead ejects gel ink, the printer heats the ink to impart a different viscosity to the ink that is suitable for ejection. Aqueous ink remains in a liquid phase at ambient temperature and, therefore, the printhead may eject aqueous ink without heating the ink.

An inkjet printer configured to print images with phase change ink, gel ink, or other types of heated ink may include an image receiving member in the form of a rotating drum or belt coated with a layer of release agent. The printhead ejects drops of heated liquid ink onto the layer of release agent to form an image. Next, the printer transfers the ink image to a recording medium, such as paper. The printer generally conducts the transfer in a nip formed by the image receiving member and a pressure roller, which is also called a transfix or transfer roller. The printer may include a heater to heat the image receiving member and/or the recording medium prior to entry in the transfixing nip. As the printer transports a recording medium through the nip, the nip transfers the fully formed image from the image receiving member to the recording medium and concurrently fixes the image to the recording medium. This technique of using heat and pressure at a nip to transfer and fix an image to a recording medium passing through the nip is typically known as "transfixing," a well known term in the art, particularly with phase change ink technology.

The controller of some inkjet printers may cause the printer to enter a power save mode to conserve electrical energy during periods in which the printer refrains from printing images. Specifically, to conserve electrical energy the printer deenergizes the heaters, which heat the image receiving member, the printheads, and other such components. During the power save mode the controller actively monitors the temperature of the heated components and energizes the heaters according to a fixed timing interval to ensure that the temperature of the heated components remains above a predetermined temperature. The aforementioned power save mode reduces the overall energy consumption of the printer; however, in response to increasingly stringent industry standards, further reduction of resource consumption during non-productive periods is desirable.

SUMMARY

A method has been developed of operating at least one component of a printing system within an operable temperature range to reduce the electrical energy consumption of the printing system. The method includes deactivating a controller and a temperature sensor operatively connected to the controller and a component, counting a temperature decay time period, activating the temperature sensor in response to expiration of the temperature decay time period, comparing a temperature measured by the temperature sensor to a predetermined temperature threshold in response to an expiration of the temperature decay time period being detected, modifying the temperature decay time period with reference to a temperature differential between the measured temperature and the predetermined temperature threshold in response to the measured temperature not being within a predetermined range about the predetermined temperature threshold, and heating the component with a heater in response to the measured temperature being less than the predetermined temperature threshold.

A solid ink inkjet printing system has been developed, having a controller and a processor, which operate at least one component of the printing system within an operable temperature range to reduce the electrical energy consumption of the printing system. The solid ink inkjet printing system includes a temperature sensor being positioned to measure a temperature of a component, a heater being positioned to heat the component, a controller operatively connected to the temperature sensor and the heater, and a processor operatively connected to the controller and temperature sensor and configured (i) to deactivate the controller and the temperature sensor, (ii) to count a temperature decay time period, (iii) to activate the controller and the temperature sensor in response to expiration of the temperature decay time period, (iv) to compare the temperature measured by the temperature sensor to a predetermined temperature threshold in response to an expiration of the temperature decay time period being detected, (v) to modify the temperature decay time period with reference to a temperature differential between the measured temperature and the predetermined temperature threshold in response to the measured temperature not being within a predetermined range about the predetermined temperature threshold, and (vi) to cause the controller to operate the heater in response to the measured temperature being less than the predetermined temperature threshold.

BRIEF DESCRIPTION OF THE FIGURES

The foregoing aspects and other features of an inkjet printing system, having a controller and a processor, which operate at least one component of the printing system within an operable temperature range to reduce the electrical energy consumption of the printing system, are explained in the following description taken in connection with the accompanying figures.

DETAILED DESCRIPTION

Figure 1:
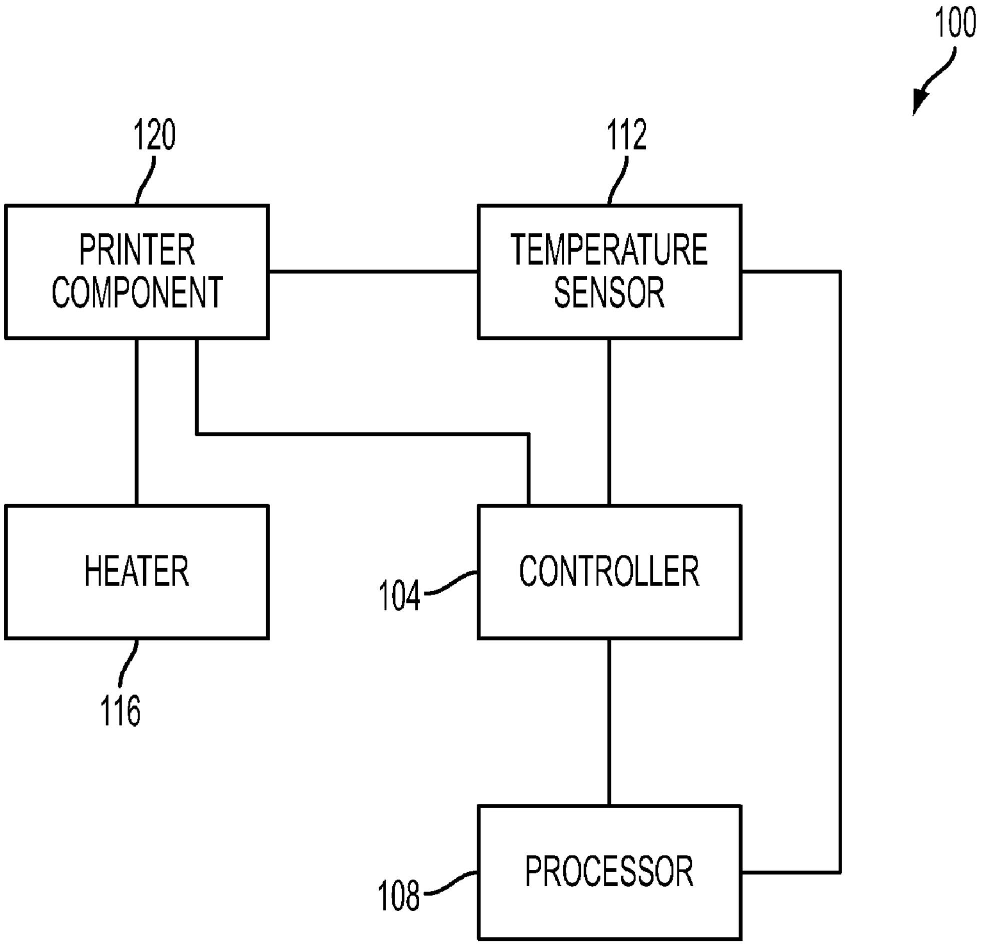
FIG. 1 is a block diagram depicting a portion of an inkjet printing system configured to print images with phase change ink.

Reference is made to the drawings for a general understanding of the environment and the details for the inkjet printing system disclosed herein. In the drawings, like reference numerals designate like elements. As used in this description, the terms “printer” and “printing system” encompass any apparatus that performs a print outputting function for any purpose, such as a digital copier, bookmaking machine, facsimile machine, multi-function machine, or the like. The terms “recording medium” and “media sheet” are used interchangeably in this description to refer to any type and size of medium on which a printer may print an image or images, with one example being letter sized printer paper and another example being a substantially continuous web of paper.

As shown in FIG. 1, a control system 100 is provided, which may be configured to implement the method described below to reduce the electrical energy consumption of a printer. The control system 100 includes a controller 104 operatively connected to a processor 108, at least one temperature sensor 112, at least one heater 116, and at least one component 120. The processor 108 is also operatively connected to the temperature sensor 112. The heater 116 is positioned to heat the printer component 120, which may be any printer component configured to be heated above the ambient temperature, such a transfix roller, an image receiving member, and/or a printhead assembly. The temperature sensor 112 is positioned to measure the temperature of the component 120.

The control system 100 implements a method, which deactivates the controller 104, the heater 116, the temperature sensor 112, and the component 120 to conserve electrical energy. The processor 108, which consumes less electrical energy than does the controller 104, remains energized for a cooling time period. The cooling time period is modified with reference to measured temperatures and temperature differentials identified between particular temperature measurements. In particular, the control system 100 may modify the duration of the cooling time period based at least in part on the temperatures of the component 120 measured at the beginning and the end of the cooling time period. Accordingly, the control system 100 adjusts the cooling time period based on the cooling rate of the component 120 in the particular environment in which the printer is operating. Although the control system 100 is described as regulating the temperature of only a single component, the control system may regulate the temperature of multiple components each associated with a temperature sensor. Cooling time is a consequence of the heating influence being removed for that time, as occurs when heater power is off during a power save or sleep mode.

The controller 104 may be a self-contained, dedicated mini-computer having a central processor unit (CPU) with electronic storage, and a display or user interface (UI). The controller 104 reads, captures, prepares, and manages the image data flow between image input sources, such as a scanning system or an online or a workstation connection, and the inkjet printhead assemblies. The controller 104 may be implemented with general or specialized programmable processors that execute programmed instructions. The instructions and data required to perform the programmed functions may be stored in memory associated with the processors or controllers. These components may be provided on a printed circuit card or provided as a circuit in an application specific integrated circuit (ASIC). Each of the circuits may be implemented with a separate processor or multiple circuits may be implemented on the same processor. Alternatively, the circuits may be implemented with discrete components or circuits provided in VLSI circuits. Also, the circuits described herein may be implemented with a combination of processors, ASICs, discrete components, or VLSI circuits.

The processor 108 may be a general or specialized programmable processor, which executes programmed instructions. The instructions and data required to perform the programmed functions may be stored in memory associated with the processor. The processor 108 and its associated memory may be provided on a printed circuit card or provided as a circuit in an application specific integrated circuit (ASIC). Additionally or alternatively, the processor 108 and its associated memory may be implemented with a field programmable gate array (FPGA). The processor 108 has an active mode in which the processor implements the method described below and an inactive mode in which the processor consumes little electrical energy.

The temperature sensor 112 may be any type of temperature sensor including thermocouples, variably resistive temperature sensors, and the like. Depending on the type of temperature sensor, the sensor 112 may have an active state and inactive state. In the active state the temperature sensor 112 senses a temperature of the component 120 and develops an electrical signal, which the controller 104 and the processor 108 receive. The electrical signal may be a temperature dependent voltage, current, and/or resistance. Accordingly, some temperature sensors 112 may consume electrical energy in the active state. In the inactive state, the temperature sensor 112 may consume no or very little electrical energy. Activating the temperature sensor 112 may refer to causing the temperature sensor to enter the active state. Deactivating the temperature sensor 112 may refer to causing the temperature sensor to enter the inactive state. Temperature sensors 112 without an active and inactive state continuously develop an electrical signal representative of the temperature of the component 120. Accordingly, activating a temperature sensor 112 without an active and inactive state may refer to receiving and processing the electrical signal generated by the temperature sensor. Deactivating a temperature sensor 112 without an active and inactive state may refer to disregarding the electrical signal generated by the temperature sensor. Thus, activating and deactivating a temperature sensor 112 without an active and inactive state may refer to using software stored within the controller 104 and/or the processor 108 to process selectively the signal generated by the temperature sensor.

The heater 116 may be any device configured to convert electrical energy into heat energy. For example, the heater 116 may be an electrically resistive element that radiates infrared energy in response to being coupled to an electrical current. Therefore, when energized, the heater 116 consumes electrical energy, and when deenergized the heater may consume no or very little electrical energy.

Figure 2:
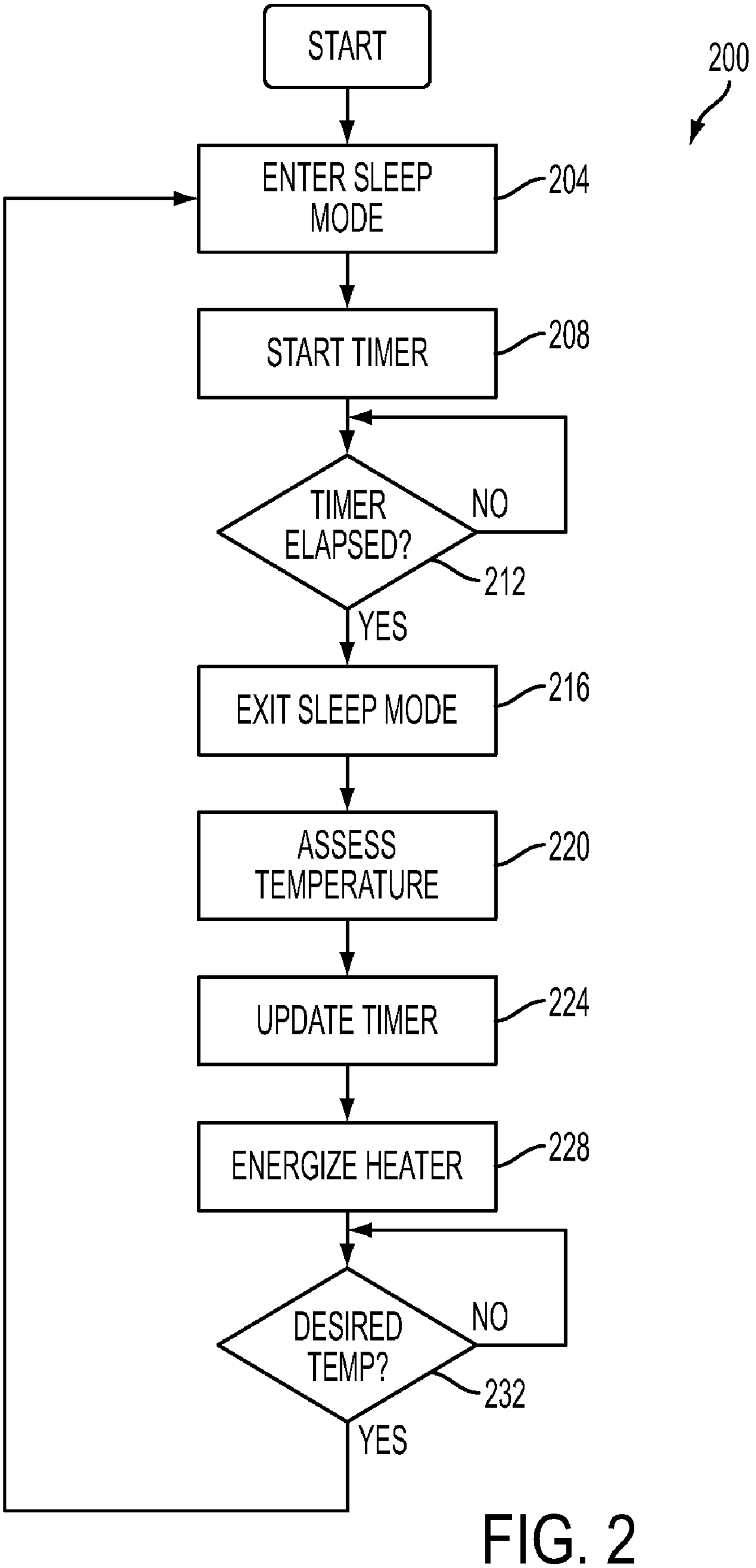
FIG. 2 is a flowchart depicting an exemplary method of operating the inkjet printing system of FIG. 1.

The control system 100 implements the method 200 of controlling the energy state of a printer illustrated by the flowchart of FIG. 2. The method 200 begins when the printer enters the power save mode (block 204). In the power save mode the control processor 108 deactivates the controller 104, then the temperature sensor 112, the heater 116, and the component 120 to reduce the electrical energy consumption of the printer. The temperature of the component 120 decreases in the power save mode at a cooling rate, which depends on the type of component 120 and the environment in which the printer is located, among other factors.

Figure 3:
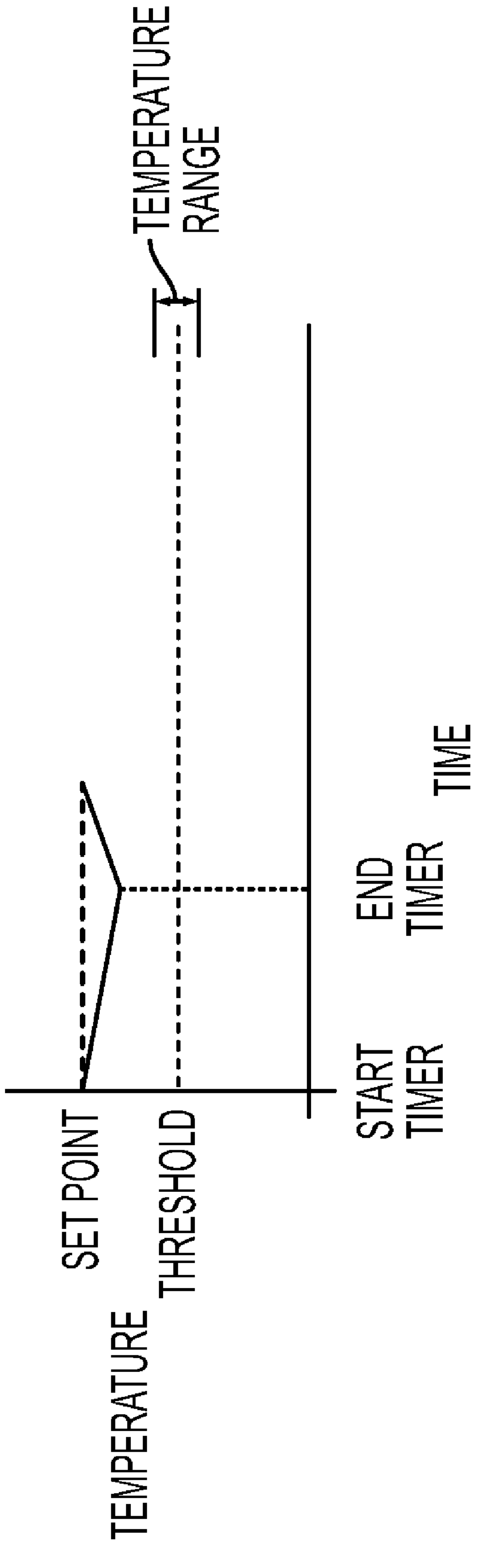
FIG. 3 is a graph depicting the change in temperature of a printer component during a time period.

Next, the processor 108 begins to count a cooling time period (block 208 and 212). As shown in FIG. 3, the temperature of the component 120 is plotted for the duration of the cooling time period as represented by the "Start Timer" and "End Timer" labels. As the time period progresses, the temperature of the component 120 cools from a reference temperature, referred to as a set point temperature, toward a temperature range/window, which includes a predetermined threshold temperature that represents a minimum desirable temperature of the component. For example, if the component 120 is a solid ink printhead assembly, ink within the printhead may solidify if lowered to a temperature sufficiently less than the threshold temperature. At the expiration of the cooling time period the processor 108 sends a wake signal to the controller 104, which causes the printer to exit the power save mode and enter the awake mode (block 216). After receiving the wake signal the controller 104 monitors the temperature of the component 120 via the signal generated by the temperature sensor 112 (block 220). Molten ink does not immediately solidify upon reaching a particular temperature. Instead it gradually changes viscosity and some constituents may solidify earlier than others as the temperature lowers. In this description, the minimum temperature included within the temperature range is viewed as being slightly above a solidification temperature. The term "threshold temperature" is likewise a convenient description that, in this document, refers not only to a specific temperature, but also to a temperature window/range in which measured temperatures above the upper end of the temperature window may result in longer cooling time, measured temperatures below the lower end of the temperature window may result in shorter cooling time, and measured temperatures within the temperature window may not result in a change to the cooling time. The temperature window separates the upper temperature threshold from the lower temperature threshold by an amount that allows at least temporary cyclic stabilization. An exemplary temperature window may have a range of approximately three degrees Celsius.

The control system 100 may adjust the duration of cooling time period, which may be described as a temperature decay time period, depending at least in part on the temperature of the component 120 subsequent to the cooling time period (block 224). During the power save mode the deenergized controller 104 and temperature sensor 112 refrain from actively monitoring the temperature of the component 120. Accordingly, upon first entering the power save mode the processor 108 utilizes a conservatively short cooling time period in order to determine the cooling rate of the component 120 in the particular operating environment of the printer. An exemplary initial cooling time period is depicted in FIG. 3. As illustrated, the temperature of the component 120 has decreased during the time period, but remains greater than the threshold temperature and greater than the upper end of the temperature window. As such, in the response to the positive temperature differential, as shown in FIG. 3, the control system 100 may change the cooling time period. For example, a conservatively short initial period could be expected to be lengthened. The control system 100 lengthens the cooling time period because the printer may remain in the power save mode for a lengthier cooling time period without causing the component 120 to cool below the threshold temperature. The cooling time period of FIG. 3 would result in the printer consuming more electrical energy than required to keep the component 120 at a suitable temperature, particularly since the controller consumes energy. If the controller 104 is energized less often, more energy savings can be achieved. Cooling time may be lengthened or decreased depending on the measured temperature relative to the threshold temperature or temperature window. The process of adjusting the cooling time is cyclic, and suspension of the cooling time adjustment or modification may occur only in response to the measured temperature falling within the temperature window. As the measured temperature falls outside of the temperature window, cooling time adjustments occur.

Figure 4:
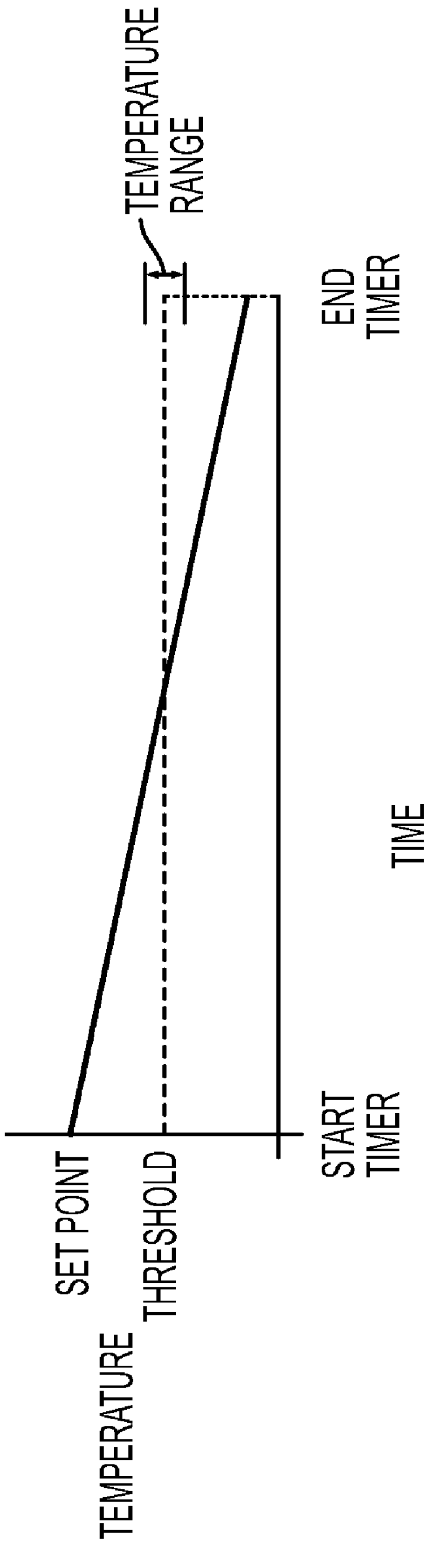
FIG. 4 is a graph depicting the change in temperature of a printer component during a time period.

As shown in FIG. 4 the control system 100 has lengthened the duration of the cooling time period such that at the end of the cooling time period the temperature of the component 120 has fallen below the threshold temperature and below the lower end of the temperature window. Depending on the embodiment, the control system 100 may consider this an acceptable cooling time period duration due to the small negative temperature differential. Alternatively, the control system 100 may determine that the component 120 has cooled to an undesirable extent during the cooling time period. In response, the control system 100 may shorten the duration of the cooling time period such that at the end of the cooling time period the temperature of the component 120 is approximately equal to or greater than the threshold temperature and within the temperature window, as shown in FIG. 5.

Figure 5:
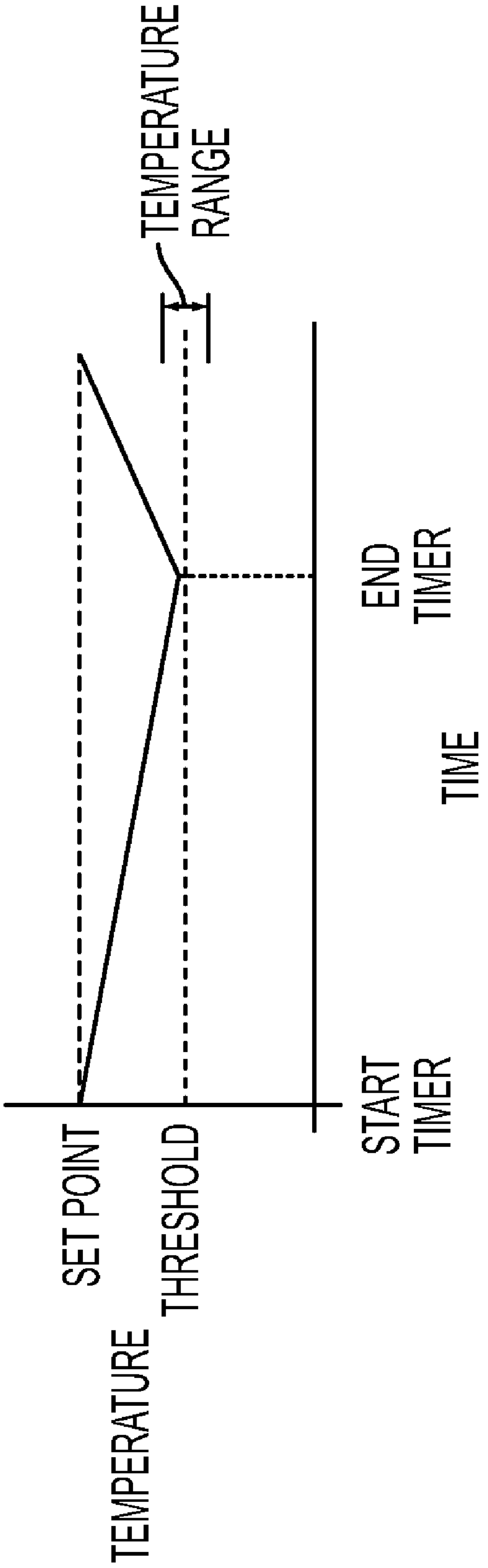
FIG. 5 is a graph depicting the change in temperature of a printer component during a time period.

Subsequent to the control system 100 configuring the duration of the cooling time period the controller 104 activates the heater 116 to heat the component 120 to the set point temperature or to another predetermined temperature, as shown by the curves having a positive slope in FIGS. 3-5 (block 228 and 232). The control system 100 may be configured to heat the component 120 with the heater 116 in response to the measured temperature being outside of the temperature window, equal to the threshold temperature, greater than the threshold temperature but within the temperature window, or less than the threshold temperature but within the temperature window. After heating the component 120, the printer enters the power save mode again and the processor 108 counts the modified cooling time period (blocks 204 and 208). Thus, with each cycle through the method 200, the control system 100 may update the duration of the cooling time period in response to the temperature of the component 120. The method 200 therefore may configure a printer for energy efficient thermal regulation in virtually any operating environment, including operating environments having a variable ambient temperature. The predetermined set point temperature and/or predetermined threshold temperature, including an upper and lower threshold temperature in a temperature window, may be altered based on attaining a cooling period duration threshold and/or a cooling period adjustment magnitude or frequency threshold.

Figure 6:
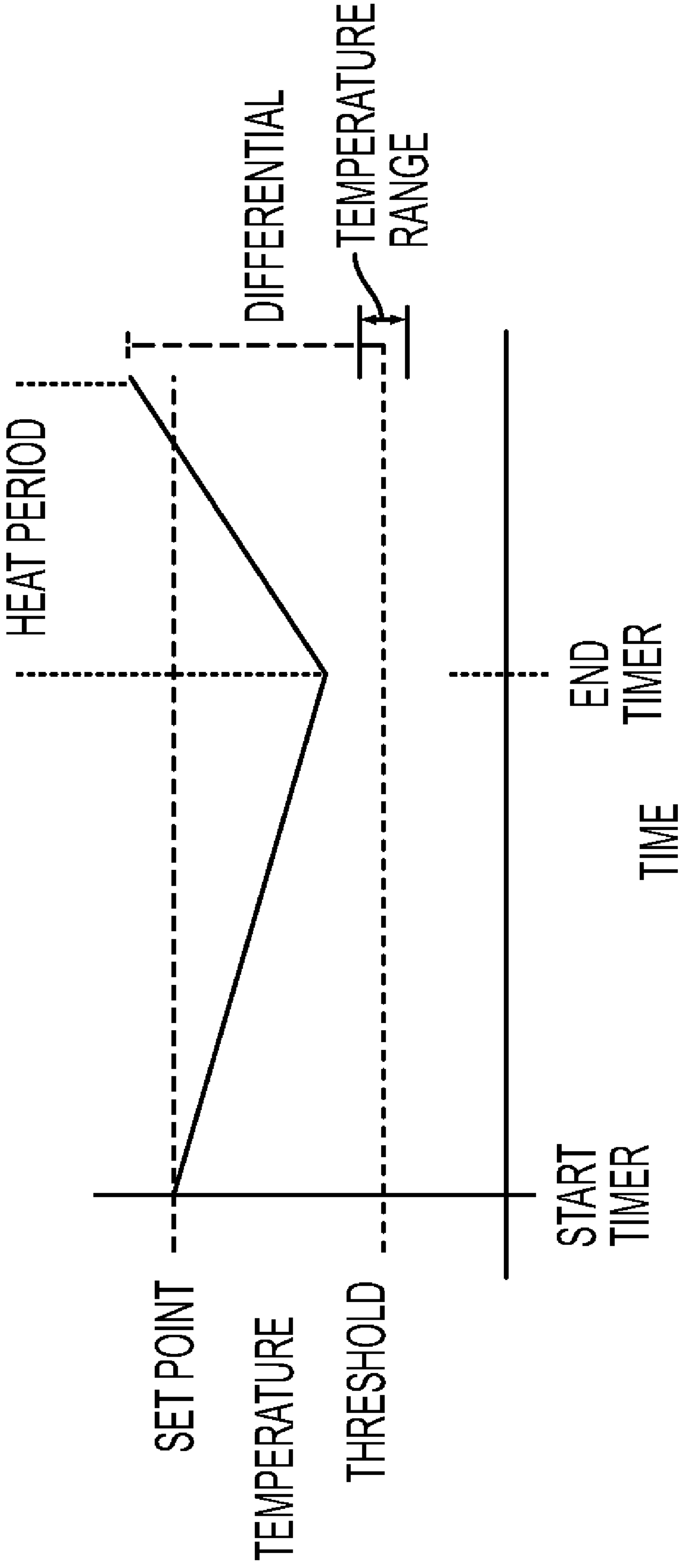
FIG. 6 is a graph depicting the change in temperature of a printer component during a time period.
Figure 7:
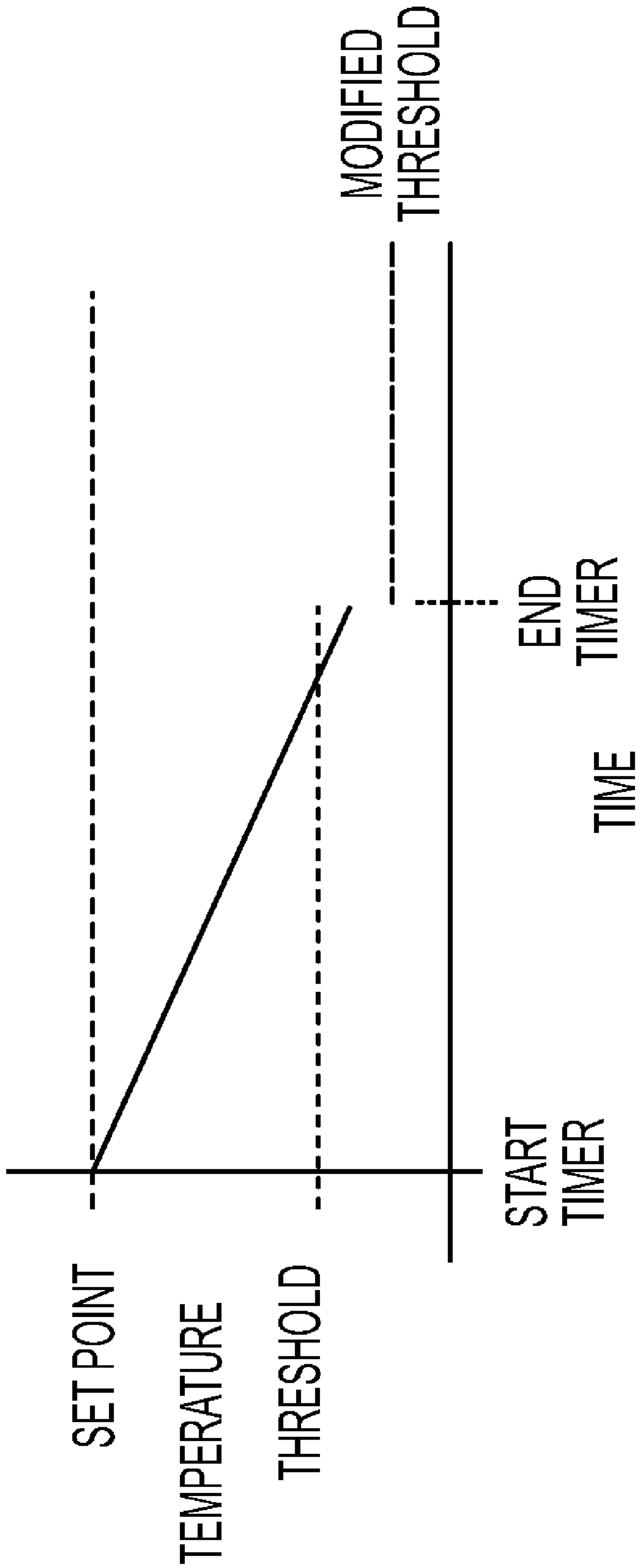
FIG. 7 is a graph depicting the change in temperature of a printer component during a time period.

The control system 100 may consider another metric when configuring the duration of the cooling time period. At the end of the cooling time period the controller 104 may heat the component 120 for a predetermined heat period, instead of heating the component to the set point temperature. At the end of the predetermined heat period the temperature of the component 120 may be greater than the set point temperature (as shown in FIG. 6) or less than the set point temperature. The control system 100 may consider the temperature differential between the threshold temperature (or a modified threshold temperature as shown in FIG. 7) and the measured temperature of the component 120 at the end of the predetermined heat period. For example, the control system 100 may lengthen the cooling period to decrease the frequency of heating in response to the measured temperature at the end of the heat period being greater than the set point temperature. Alternatively, the control system 100 may shorten the cooling period to increase the frequency of heating in response to the measured temperature at the end of the heat period being less than the set point temperature.

The control system 100 may also be configured to adjust the predetermined threshold temperature with reference to the duration of the cooling time period. As shown in FIG. 7, at the end of the cooling time period the temperature of the component 120 has fallen below the threshold temperature. In response to this situation, the control system 100 may determine that the measured temperature of the component 120 at the end of the cooling time period is acceptable and in response the controller system may decrease the threshold temperature. Alternatively, the control system 100 may determine that at the end of the cooling time period the measured temperature of the component 120 requires an increase in the threshold temperature. Each of the variables of cooling time, energized heater time, and upper temperature set point may be adjusted individually or in any combination. Printer usage has a significant effect on temperatures attained within the printer unit as printer operation causes various subsystems of the printer to warm, for example. The controller may employ additional sensors, a look up table related to active operational duration time periods, and the like to modify the energy saving cooling time further to reflect different operational modes and levels of operational activity.

The control system 100, and its associated method of operation, efficiently configures the thermal energy state of the printer. As described above, the control system 100 configures the duration of the cooling time period with reference to previous heating and cooling cycles, such that with each cycle of the method the duration of the cooling time period more closely approaches a desired duration. For example, at the desired duration the control system 100 may provide maximum fluctuation of the temperature of the component 120 between the set point temperature and the threshold temperature without permitting the component to sustain a temperature below the threshold temperature. The fluctuation reduces the average temperature of the component 120 during the cooling time period and, therefore, reduces the electrical energy required to maintain the temperature of the component by minimizing frequency of activations and temperature overshoots. Additionally, the method provides energy savings by refraining to monitor actively the temperature of the component 120 during the power save mode. For example, the control system 100 may consume between approximately 4.0 to 6.0 watts of electrical power when the printer is in the active print mode and the awake mode, and may consume 1.0 watt of electrical power when the printer is in the power save mode. The processor 108 in the power save mode may consume approximately 0.7 watts. Therefore, operating the processor 108 instead of the control system 100 in the power save mode offers a significant energy savings.

Figure 8:
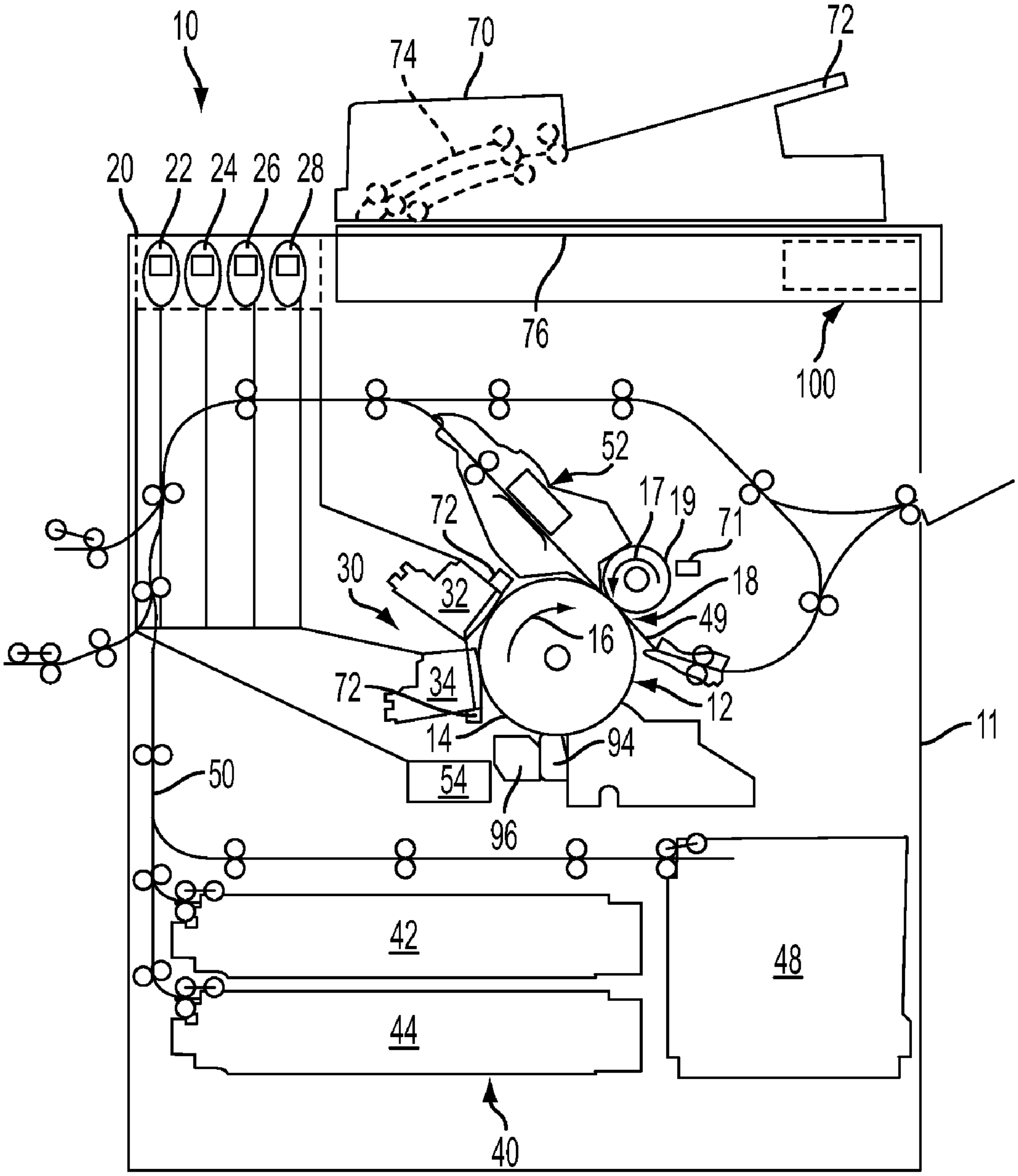
FIG. 8 is a schematic side elevational view of an inkjet printing system configured to print images with phase change ink.

The control system 100 of FIG. 1 may control a printer such as the printer 10 of FIG. 8. The printer includes a frame 11 to which are connected directly or indirectly all its components and subsystems. The printer 10 includes an image receiving member, which is shown in the form of a drum 12, but can equally be in the form of a supported endless belt or the like. The drum 12 has an imaging surface 14 on which a printhead system 30 forms phase change ink images. An actuator 96 is operatively connected to the drum 12 to rotate the drum in the direction 16. A heater 94 is operatively configured to heat the imaging surface 14 to a drum operating temperature. The heater 94 is operatively connected to the controller 104.

A transfix roller 19 of the printer 10 is rotatable in the direction 17 and is loaded against the surface 14 of the drum 12 to form a transfix nip 18. The printer 10 transfixes ink images from the surface 14 onto a media sheet 49 within the nip 18. An actuator is operatively coupled to the transfix roller 19 to move the transfix roller towards and away from the drum 12. The transfix roller 19 may include a heater 71, which is operatively configured to heat the transfix roller to a transfix roller operating temperature. The heater 71 is operatively connected to the controller 104.

The printer 10 also includes an ink delivery system 20, which includes at least one source 22 of phase change ink in the solid form. The printer 10 is a multicolor inkjet printer; accordingly, the illustrated ink delivery system 20 includes four (4) sources 22, 24, 26, 28 of phase change ink, representing four (4) different colors of phase change ink, for example, CMYK (cyan, magenta, yellow, black). The ink delivery system 20 further includes a melting and control apparatus 54 for melting or phase changing the solid form of the phase change ink into liquid ink. The ink delivery system 20 supplies the liquid ink to the printhead system 30, which includes at least one inkjet printhead assembly 32, 34 connected to the frame 11 in a position suitable to eject ink onto the surface 14. Each printhead assembly 32, 34 includes a heater 72 configured to maintain the ink within the printheads in the liquid phase. The heater 72 is operatively connected to the controller 104.

As further shown, the printer 10 includes a media supply and handling system 40. The media supply and handling system 40 may include sheet or other media supply sources 42, 44, 48, of which supply source 48, for example, is a high capacity paper supply or feeder for storing and supplying image receiving media in the form of cut sheets 49. The media supply and handling system 40 also includes a media handling and treatment system 50, which includes a media heater 52. The media heater 52 is operatively positioned along a transport path and is configured to heat the recording medium to a recording medium operating temperature before the medium enters the nip 18. The heater 52 is operatively connected to the controller 104. The printer 10 may also include an original document feeder 70 that has a document holding tray 72, document sheet feeding and retrieval devices 74, and a document exposure and scanning system 76, each of which are known to those of ordinary skill in the art.

It will be appreciated that some or all of the above-disclosed features and other features and functions or alternatives thereof, may be desirably combined into many other different systems, apparatus, devices, or applications. Various presently unforeseen or unanticipated alternatives, modifications, variations, or improvements therein may be subsequently made by those skilled in the art, which are also intended to be encompassed by the following claims.

What is claimed is:

1. A method of operating a component of a printing system within an operable temperature range comprising:

deactivating a controller and a temperature sensor operatively connected to the controller and a component;

counting a temperature decay time period;

activating the temperature sensor in response to expiration of the temperature decay time period;

comparing a temperature measured by the temperature sensor to a predetermined temperature threshold in response to an expiration of the temperature decay time period being detected;

modifying the temperature decay time period with reference to a temperature differential between the measured temperature and the predetermined temperature threshold in response to the measured temperature not being within a predetermined range about the predetermined temperature threshold; and heating the component with a heater in response to the measured temperature being less than the predetermined temperature threshold.

2. The method of claim 1 further comprising:

counting the temperature decay time period with a processor that consumes less electrical energy than the controller; and modifying the temperature decay time period with the processor.

3. The method of claim 2 further comprising:

deactivating the temperature sensor;

counting the modified temperature decay time period with the processor;

activating the temperature sensor; and modifying the modified temperature decay time period with reference to a temperature differential between the measured temperature and the predetermined temperature threshold in response to the measured temperature not being within the predetermined range about the predetermined temperature threshold.

4. The method of claim 3 wherein the deactivation of the temperature sensor, the counting of the modified time decay time period, the activation of the temperature sensor, and the modification of the modified temperature decay time period continues until the measured temperature falls within the predetermined range about the predetermined temperature threshold.

5. The method of claim 1 further comprising:

counting a temperature rise time period in response to the heater being operated;

measuring a temperature with the temperature sensor in response to expiration of the temperature rise time period; and setting the temperature decay time period with reference to a temperature differential between the measured temperature and the predetermined temperature threshold.

6. The method of claim 1 further comprising:

activating the controller in response to the measured temperature being less than the predetermined temperature threshold.

7. The method of claim 1 further comprising:

modifying the predetermined temperature threshold with reference to the modified temperature delay time period.

8. The method of claim 7 further comprising:

deactivating the temperature sensor;

counting the modified temperature decay time period;

activating the temperature sensor; and modifying the modified temperature decay time period with reference to a temperature differential between the measured temperature and the modified predetermined temperature threshold in response to the measured temperature not being within the predetermined range about the modified predetermined temperature threshold.

9. The method of claim 8 wherein the deactivation of the temperature sensor, the counting of the modified time decay time period, the activation of the temperature sensor, and the modification of the predetermined temperature threshold continues until the measured temperature is within the predetermined range about the modified predetermined temperature threshold.

10. The method of claim 7 further comprising:

counting a temperature rise time period in response to the heater being operated;

measuring a temperature with the temperature sensor in response to expiration of the temperature rise time period;

setting the temperature decay time period with reference to a temperature differential between the measured temperature and the modified predetermined temperature threshold.

11. The method of claim 1 further comprising:

modifying the predetermined range about the predetermined temperature threshold with reference to the modified temperature delay time period.

12. The method of claim 11 further comprising:

deactivating the temperature sensor;

counting the modified temperature decay time period;

activating the temperature sensor; and modifying the modified temperature decay time period with reference to a temperature differential between the measured temperature and the predetermined temperature threshold in response to the measured temperature not being within the modified predetermined range about the predetermined temperature threshold.

13. The method of claim 12 wherein the deactivation of the temperature sensor, the counting of the modified time decay time period, the activation of the temperature sensor, and the modification of the predetermined temperature threshold continues until the measured temperature is within the modified predetermined range about the predetermined temperature threshold.

14. The method of claim 1 wherein the component is one of a printhead assembly, a transfix roller, and an image receiving member.

15. A solid ink inkjet printing system comprising:

a temperature sensor being positioned to measure a temperature of a component;

a heater being positioned to heat the component;

a controller operatively connected to the temperature sensor and the heater; and a processor operatively connected to the controller and temperature sensor and configured (i) to deactivate the controller and the temperature sensor, (ii) to count a temperature decay time period, (iii) to activate the controller and the temperature sensor in response to expiration of the temperature decay time period, (iv) to compare the temperature measured by the temperature sensor to a predetermined temperature threshold in response to an expiration of the temperature decay time period being detected, (v) to modify the temperature decay time period with reference to a temperature differential between the measured temperature and the predetermined temperature threshold in response to the measured temperature not being within a predetermined range about the predetermined temperature threshold, and (vi) to cause the controller to operate the heater in response to the measured temperature being less than the predetermined temperature threshold.

16. The solid ink inkjet printing system of claim 15, wherein the processor consumes less electrical energy to count the temperature decay time period than does the controller to count the temperature decay time period.

17. The solid ink inkjet printing system of claim 15, the processor being further configured (i) to deactivate the temperature sensor, (ii) to count the modified temperature decay time period, (iii) to activate the temperature sensor, and (iv) to modify the modified temperature decay time period with reference to a temperature differential between the measured temperature and the predetermined temperature threshold in response to the measured temperature not being within the predetermined range about the predetermined temperature threshold.

18. The solid ink inkjet printing system of claim 17, wherein the deactivation of the temperature sensor, the counting of the modified time decay time period, the activation of the temperature sensor, and the modification of the modified temperature decay time period continues until the measured temperature is within the predetermined range about the predetermined temperature threshold.

19. The solid ink inkjet printing system of claim 15, the processor being further configured (i) to count a temperature rise time period in response to the heater being operated, (ii) to measure a temperature with the temperature sensor in response to expiration of the temperature rise time period, and (iii) to set the temperature decay time period with reference to a temperature differential between the measured temperature and the predetermined temperature threshold.

20. The solid ink inkjet printing system of claim 15, the processor being further configured to activate the controller in response to the measured temperature being less than the predetermined temperature threshold.

21. The solid ink inkjet printing system of claim 15, the processor being further configured to modify the predetermined temperature threshold with reference to the modified temperature delay time period.

22. The solid ink inkjet printing system of claim 21, the processor being further configured (i) to deactivate the temperature sensor, (ii) to count the modified temperature decay time period, (iii) to activate the temperature sensor, and (iv) to modify the modified temperature decay time period with reference to a temperature differential between the measured temperature and the modified predetermined temperature threshold in response to the measured temperature being within the predetermined range about the modified predetermined temperature threshold.

23. The solid ink inkjet printing system of claim 22 wherein the deactivation of the temperature sensor, the counting of the modified time decay time period, the activation of the temperature sensor, and the modification of the predetermined temperature threshold continues until the measured temperature is within the predetermined range about the modified predetermined temperature threshold.

24. The solid ink inkjet printing system of claim 15, the processor being further configured to modify the predetermined range about the predetermined temperature threshold with reference to the modified temperature delay time period.

25. The solid ink inkjet printing system of claim 24, the processor being further configured (i) to deactivate the temperature sensor, (ii) to count the modified temperature decay time period, (iii) to activate the temperature sensor, and (iv) to modify the modified temperature decay time period with reference to a temperature differential between the measured temperature and the predetermined temperature threshold in response to the measured temperature being within the modified predetermined range about the predetermined temperature threshold.

26. The solid ink inkjet printing system of claim 25 wherein the deactivation of the temperature sensor, the counting of the modified time decay time period, the activation of the temperature sensor, and the modification of the predetermined temperature threshold continues until the measured temperature is within the modified predetermined range about the predetermined temperature threshold.

* * * * *